Oct. 12, 1954

E. A. OLSON  2,691,474

METHOD OF AND APPARATUS FOR FORMING A FLUID-TIGHT
SEAL IN THERMOPLASTIC MATERIAL

Filed June 15, 1953

Inventor
Edward A. Olson
by Roberts Cushman & Grover
Atty's

Oct. 12, 1954 E. A. OLSON 2,691,474
METHOD OF AND APPARATUS FOR FORMING A FLUID-TIGHT
SEAL IN THERMOPLASTIC MATERIAL
Filed June 15, 1953 3 Sheets-Sheet 2

Inventor
Edward A. Olson
by Roberts Cushman & Grover
Atty's

Oct. 12, 1954 E. A. OLSON 2,691,474
METHOD OF AND APPARATUS FOR FORMING A FLUID-TIGHT
SEAL IN THERMOPLASTIC MATERIAL
Filed June 15, 1953 3 Sheets-Sheet 3
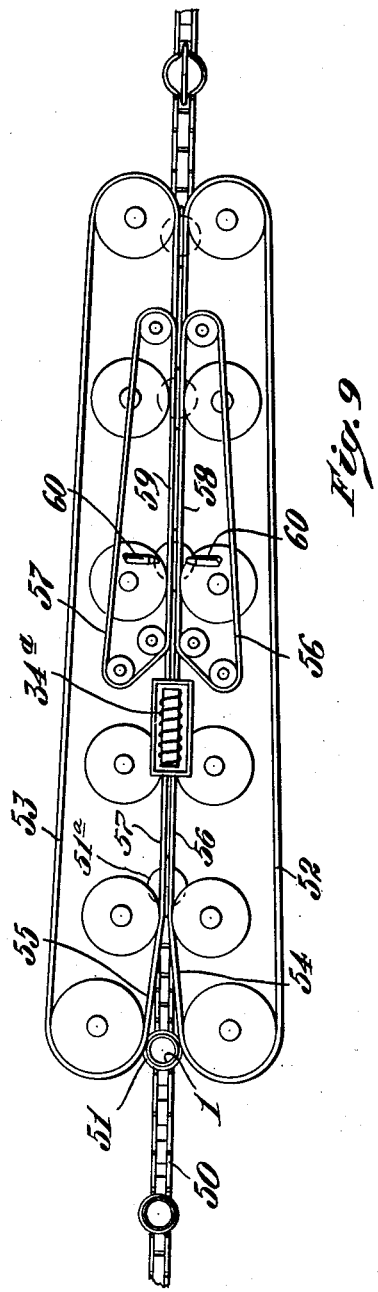
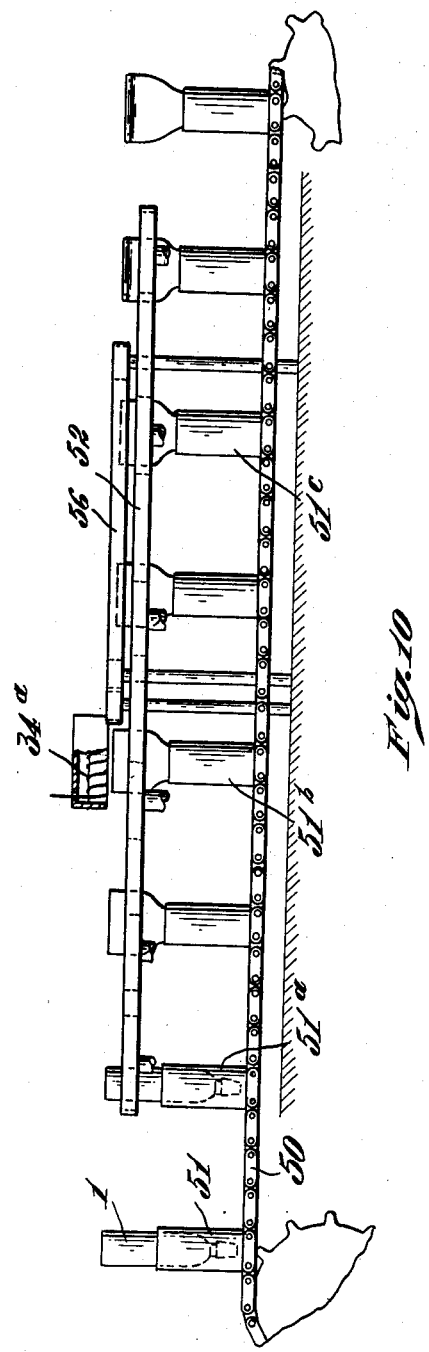
Inventor
Edward A. Olson
by Roberts Cushman Grover
Atty's Patented Oct. 12, 1954

2,691,474

UNITED STATES PATENT OFFICE 2,691,474

METHOD OF AND APPARATUS FOR FORMING A FLUID-TIGHT SEAL IN THERMOPLASTIC MATERIAL

Edward A. Olson, Ashland, Mass.

Application June 15, 1953, Serial No. 361,659

10 Claims. (Cl. 226—19)

This invention pertains to a method of and apparatus for forming a fluid-tight seam in thermoplastic material and more especially for closing and sealing the end of a collapsible dispensing tube made of such material.

Dispensing tubes have commonly been made of thin metal, for example tin, and are closed at their lower or filling ends after filling, by folding or rolling the metal on itself. While such metal tubes are entirely satisfactory when used for dispensing substances which are chemically inert, for instance, tooth paste or shaving cream, they are not useful for the dispensing of substances which are contaminated by contact with the metal or which attack the metal so as eventually to form holes through which leakage may take place. For instance the calcium hydroxide paste now customarily used by dentists in preparing tooth cavities to receive fillings reacts corrosively with tin tubes, so that such tubes cannot be used for dispensing this particular material. Experiments seem to show that dispensing tubes made of Pliofilm, that is to say, a polyethylene synthetic resin, are the best at present available for dispensing this dental preparation. This preparation is in the form of a stiff paste and is filled into the open end of the empty tube, the latter initially being of circular transverse section. After the tube has been filled, the end through which the filling took place must be closed leak-tight and so sealed as to prevent extrusion of the contents even when the tube is subjected to the considerable pressure required to extrude the pasty material through the small dispensing passage in the neck of the tube.

The formation of good joints in many thermoplastic resins is readily accomplished by squeezing contacting plies of the material between heated jaws, but this method is not applicable to polyethylene, for this material sticks firmly to the hot jaws, making it impractical, as a commercial matter to seal the ends of tubes made of this material by the use of heated jaws.

The present invention has for its principal object the provision of a novel method of and means for uniting contacting plies of polyethylene synthetic resin or materials having similar characteristics, so as to form a leaktight union between such plies, and in particular, to close and seal the end of a dispersing tube made of polyethylene resin. A further object is to provide means for forming a joint between plies of polyethylene comprising means for heating the areas to be joined, solely by radiant heat, and having jaws which, at normal room temperature, are caused to squeeze the material already softened by heat and to hold them in contact while the material sets. Other and further objects and advantages of the invention will be pointed out in the following, more detailed description and by reference to the accompanying drawings wherein Fig. 1 is a side elevation of an inverted dispensing tube as it appears after having been filled but before its filling end has been closed;

Fig. 9 is a diagrammatic plan view of a modified form of apparatus for use in the practice of the invention; and Fig. 10 is a fragmentary diagrammatic elevation of the device of Fig. 9.

Figures 1, 2, 3:
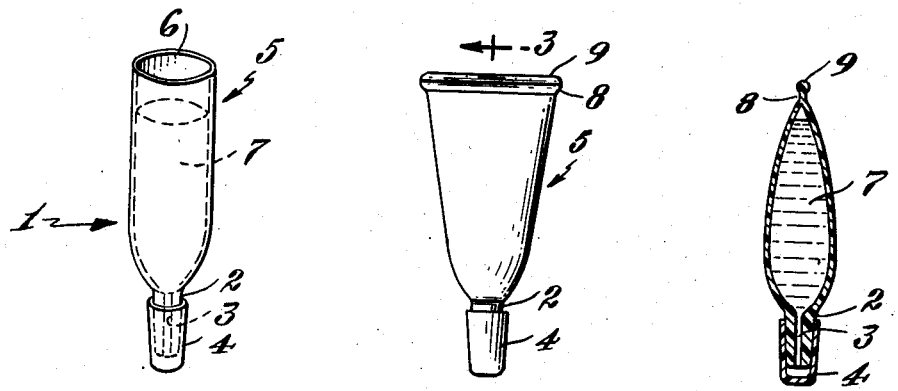
Fig. 2 is a side elevation of the same tube after its filling end has been closed according to the present invention.
Fig. 3 is a diagrammatic section on the line 3—3 of Fig. 2.

Referring to the drawings, the numeral 1 designates a dispensing tube made of a thermoplastic material, for example, a polyethylene synthetic resin, the tube having the neck portion 2 at its dispensing end, the neck portion having an axial bore 3 through which the contents of the tube may be extruded, and having a removable cap 4 which normally fits tightly over the neck 2 to prevent the entry of air into the tube. The filling end of the tube (which is the end through which the material to be dispensed is introduced into the tube) is initially substantially circular, having the edge 6 which, since the tube is shown inverted in Fig. 1, is here referred to as the upper edge. Such a tube of polyethylene resin is particularly useful in the dispensing of substances which have a corrosive action in contact with metal. As above noted, the tube 1 may be employed for example, for the dispensing of dental preparations containing calcium hydroxide.

Such preparations are usually in the form of a stiff paste. In filling the tube, the paste 7 does not extend to the extreme edge 6 of the tube, leaving a marginal portion 5 of the tube for manipulation in the closing operation.

In accordance with the practice of the present invention, after the tube has received its charge of the material 7, its marginal portion 5 is first flattened so that opposite walls of the tube form contacting plies, and then these plies are so treated as to cause them to coalesce along a narrow transversely extending area 8, as shown in Fig. 3, usually with the formation of a thickened edge-bead 9 whose presence provides additional assurance against leakage.

Referring to Figs. 4 to 8, inclusive, there is illustrated a very simple hand-operated machine for use in the practice of the method. This machine comprises a base member 10, which may be of cast metal or the like, and on which is mounted a block 11 of a height approximating the length of the tube to be closed. A block 12 is also mounted on the base 10, the proximate ends of the blocks 11 and 12 being spaced apart to provide a chamber 13 of a width substantially exceeding the diameter of the tube to be closed. Within this chamber 13 there is arranged a tube holder 14 mounted on the base, preferably close to the inner wall of the block 11, this holder having a cavity 15 which is properly shaped to receive the lower end portion of the inverted tube in readiness to have its filling end closed and sealed.

The block 11 has a clamping face 16 which is vertically narrow, but of a width such as to extend across the entire width of the flattened end portion of the tube, the face 16 being spaced approximately the thickness of the tube material from the vertical axis of the cavity 15 of the tube holder.

A carriage 17 is mounted on the upper surface of the block 12, the latter being of less height than the block 11, so that the upper surface of the carriage 17 is in the same plane as the upper surface of the block 11. This carriage has a vertical clamping face 18 which is directly opposed to the face 16 of the block 11 and which has substantially the same dimensions as the face 16. An eccentric 19, mounted on a stud 20 fixed in the block 12, bears against the outer or lefthand edge of the carriage 17 as viewed in Figs. 4, 5 and 6, and is provided with a handle 21 (Fig. 7), by means of which it may be turned. The parts are so arranged that when the eccentric has been turned to its position of maximum throw, the clamping face 18 of the carriage will be so spaced from the clamping face 16 as to flatten and firmly to clamp the tube material between said faces. If desired, a spring 21 (Figs. 4, 6 and 7) may be arranged to keep the carriage in contact with the eccentric and to assist in returning the carriage to its inoperative position when the eccentric is moved to the release position.

A presser member 22 (Fig. 4) is mounted to slide on the upper face of the block 11, this presser member having a vertical tube-contacting edge face 23 and having a circular opening which receives an eccentric 24 mounted on a stud 25, and having an actuating handle 26. By properly turning this handle, the presser member 23 may be moved to the left, as viewed in Fig. 5, until it occupies the position shown in Fig. 6, where its pressing face 23 contacts the material of the tube. A spring 27 may be arranged, if desired, to assist in moving the presser member 22 back to the inoperative position.

A second presser member 28 is mounted to slide on the upper surface of the carriage 17 and has a vertical pressing face 29 (Fig. 4) which is opposed to the face 23 of the presser 22. This presser 28 has a circular opening for the reception of an eccentric 30 mounted on a stud 31 fixed in the carriage 17, the eccentric having an actuating handle 32, by means of which the presser 28 may be moved from the position of Fig. 4 to that of Fig. 6, where its pressing face 29 engages the material of the tube. A spring 33 may be provided, if desired, to assist in moving the presser 28 back to the inoperative position.

Figure 4:
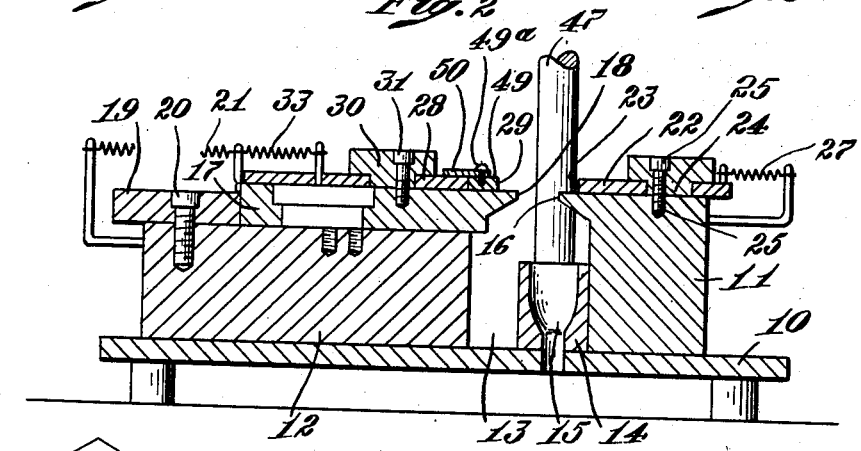
Fig. 4 is a diagrammatic vertical section illustrating one form of apparatus which may be employed in the practice of the present invention, the apparatus being shown with its parts in a position to receive a tube to be closed.
Figure 4A:
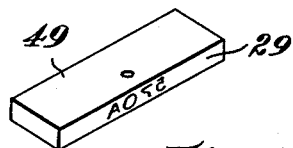
Fig. 4a is a perspective view, to larger scale, illustrative of a removable pressing jaw which may be employed, if desired.
Figure 5:
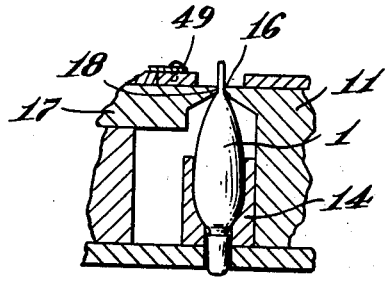
Fig. 5 is a fragmentary section in the same plane as Fig. 4, but showing only those portions which engage the tube, and illustrating the first step in the closing of the tube.
Figure 8:
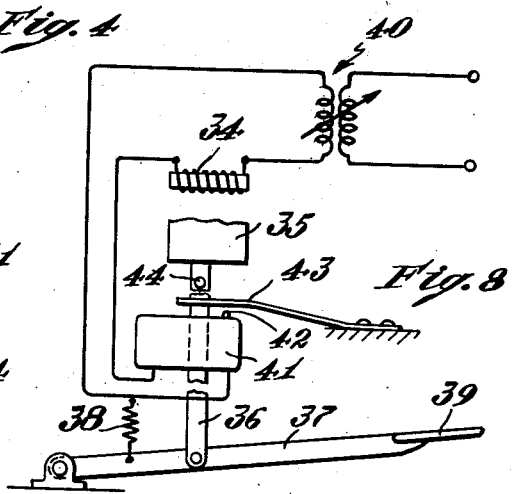
Fig. 8 is a diagrammatic view illustrative of an electrical circuit and means for controlling it.
Figure 7:
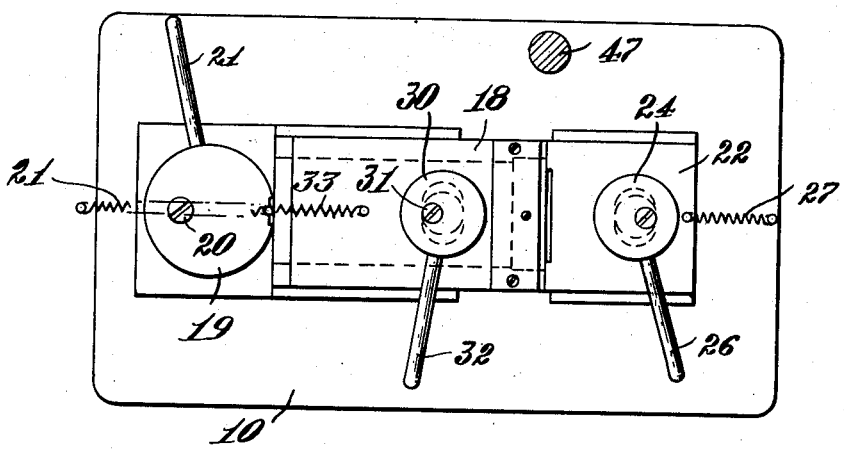
Fig. 7 is a plan view of the parts shown in Fig. 6, but omitting the heating device.
Figure 6:
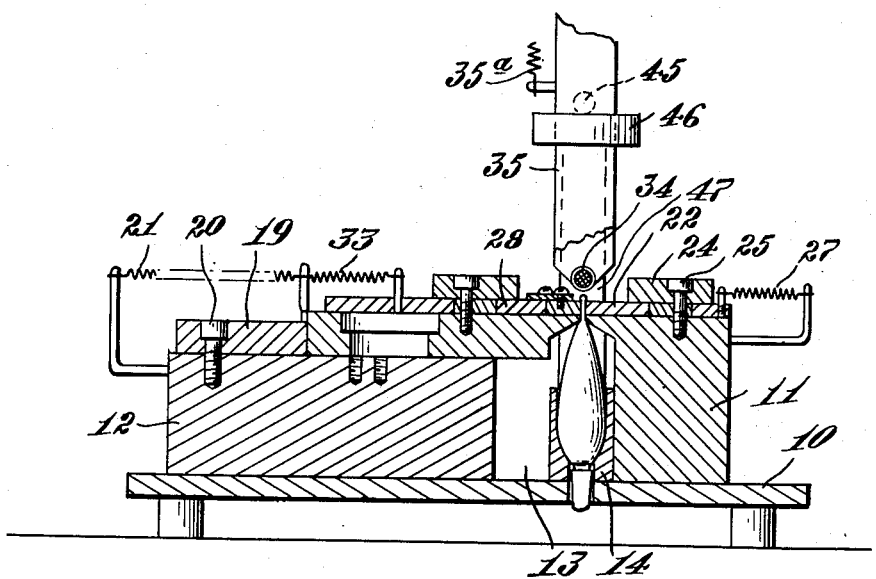
Fig. 6 is a side elevation of the apparatus of Fig. 4 showing the heating means in the position which it occupies for softening the end of the tube, the presser members having just been closed.

If desired, the face 29 of the presser 28 may be formed on a removable block 49, Fig. 4a, removably secured to the main portion of the presser by means of a screw 49a and clamping plate 50. This removable block 49 may, for example, be provided on its pressing face 29 with projecting or depressed characters or letters which act as printing media to form corresponding characters or indicia in the material of the tube during the closing operation. Such an arrangement is desirable as a means of identifying the contents of the tube or the date at which the tube was closed. A heater element, here shown as a resistance coil 34 (Fig. 6), is mounted on a vertically movable support 35 which may be normally held in elevated, inoperative position by a spring 35a, Fig. 6. The part 35 which carries the heater coil 34 is provided with a downwardly extending link 36, Fig. 8, which is connected to a treadle lever 37 which is normally raised by a spring 38 and which has a treadle 39 at its forward end, by means of which it may be depressed, thus moving the support 35 downwardly to dispose the heating coil 34 in operative position.

The coil 34 is supplied with electrical current from any suitable source, for example, by means of the transformer 40 (Fig. 8), the supply of current to the coil being controlled by a switch 41, for example, of the micro type, having the circuit closing pin 42.

A spring arm 43 overlies the pin 42 and is in the path of a stud 44, projecting from the link 36. When the treadle 39 is depressed, the heating coil 34 is moved downwardly and as it approaches operative position, the switch is closed, thus supplying current for heating the coil. In order to position the coil at the exact desired distance above the upper edge of the tube to be sealed, the coil support 35 is provided with a stud 45 (Fig. 6), which engages a vertically adjustable stop member 46 mounted on a post 47, the stud 45 and stop 46 being so arranged that when the heating coil 34 is in the operative position, it is slightly above the upper edge 6 of the tube, so that the heating of the tube results solely from the radiant energy from the coil rather than because of contact of a heated solid element with the material of the tube.

In the operation of this mechanism, and assuming that the parts as are shown in Fig. 4 with the clamping faces 16 and 18 separated and with the heating coil 34 in its elevated inoperative position, the operator will place the filled tube with its neck portion downwardly within the cavity 15 in the cup 14, the upper marginal portion 5 of the inverter tube extending up along the surface 16 of the clamping element. In placing the tube in this position, the upper portion is flattened to some extent. The operator then moves the handle 21 until the eccentric 19 occupies the position shown in Fig. 7. This movement of the eccentric advances the carriage 17 to the right, until at the extreme position of the eccentric, the clamping faces 16 and 18 will engage the outer surface of the tube at diametrically opposite points with pressure sufficient to collapse this marginal portion of the tube and cause its walls to contact so that the marginal portion of the tube, between the faces 16 and 18 forms two contacting plies of the tube material. Because of the use of an eccentric for advancing the carriage 17, the handle 21 may be released without permitting the carriage 17 to retract so that the faces 16 and 18 now clamp between them a vertically narrow transversely extending area of the tube.

The operator now depresses the treadle 29 which moves the heater support 35 downwardly, until the stop pin 45 engages the stop member 46. When these parts are in engagement, the heating coil is disposed (Fig. 6), just above the marginal end portion of the tube, with the upper edge of the tube spaced from the coil 34 so as not to contact the latter. As the heater support 35 moves downwardly, its projecting stud 44 (Fig. 8) depresses the spring arm 43, thus actuating the switch pin 42 to close the circuit, and supplying current to the heating coil. The coil is immediately heated to redness or incandescence and the radiant heat from this coil very quickly softens that marginal portion of the tube which projects above the upper surfaces of the clamping faces 16 and 18. Experience with the particular material of which the tube is made will indicate the length of time requisite to heat the marginal portion of the tube so as to fuse the tube material. A period of the order of 15 seconds has been found amply sufficient when using tubes of polyethylene resin. If desired, a signal, for example, a lamp or bell, may be arranged to indicate to the user when to release the treadle 39 and thus withdraw the heater from the vicinity of the tube. As soon as the treadle is released, the spring 38, or equivalent means, raises the support 35, thus moving the heater coil away from the tube and from the vicinity of the clamping elements 16 and 18 so that the latter parts are exposed to the heat for but a short time. This return of the heater coil to its inoperative position takes place just before the presser faces 23 and 29 are moved to the operative position shown in Fig 4, as now to be described. The operator now moves the handles 26 and 32 (Fig. 7), preferably simultaneously, and in opposite directions, so that the eccentrics 24 and 30 move the presser members 22 and 28 toward each other until their faces 23 and 29 squeeze the fused marginal portion of the tube into coalescing engagement. These presser elements 23 to 28 are not exposed to the direct heat from the coil 34 when the latter is in operative position and since they are in contact with metallic parts of substantially mass and external area, the presser elements do not become heated to any substantial degree above room temperature, even during extended periods of operation of the mechanism. Thus, the faces 23 to 29 of these elements are substantially cold, that is to say, at approximately room temperature, when they contact the tacky marginal material of the tube, and under these conditions, the tube material does not show any tendency to stick to the presser members. The pressure may be maintained as long as desired and because of the employment of the eccentric members 24 and 30 for advancing the presser members, the operator need not hold the handles 26 and 32 during this pressing period. However, this period is relatively short, for example, of the order of fifteen seconds and as soon as this time has expired, the operator moves the handles 26 and 32 apart and then moves the handle 21 to retract the carriage 17, thus releasing the tube. The pressure of the parts 23 and 28 against the softened tube material causes the opposing plies to coalesce so as to form a completely leaktight joint. Usually the pressure is such that a portion of the softened material is extruded upwardly above the presser elements, producing a bead-like finish 9 consisting of a solid mass of the fused material. The presence of this solid mass of material above the joint between the opposing plies helps to prevent any possible leakage at the sealed end of the tube. After removing the tube from the cup 14, the machine is in readiness for the start of a new cycle, the entire operation, when using a tube of polyethylene resin, taking approximately fifteen seconds, and with the result of forming a perfect, non-leaking seal in a material which heretofore has presented such difficulties in sealing as to have precluded its use for the purpose above described.

While the very simple manually operated apparatus heretofore described, has been found useful and entirely satisfactory for the purpose, it is contemplated that the operation may be made automatic, for example, by the employment of apparatus such as diagrammatically suggested in Figs. 9 and 10. In this device, an endless chain 50 carries a series of tube holders 51, 51a, 51b, 51c, etc., spaced equally apart, the chain being so supported that a horizontal run of the chain carries these holders with their axes vertical and with their tube-receiving cavities directed upwardly.

At a level above this chain and above the upper ends of the tube holders, two endless steel ribbons 52 and 53 are arranged, these ribbons being constantly driven by suitable means and comprising convergent runs 54 and 55 which converge at a point directly above the chain 50 and an elevation above the chain such that the upper end portion of a tube 1 (Fig. 9), carried along in one of the holders 51 will enter between the converging bands or ribbons 54 and 55 so that its upper end portion will gradually be flattened. From their converging portions the bands extend in parallel runs 56 and 57, suitably guided and positioned by rollers or the like, the spacing between the bands 56 and 57 being such that the opposite walls of the flattened tube are held in contact by the bands, as the tube-holder advances, the bands being driven at the same linear velocity as the chain 50. At a suitable point, a heater 34a is arranged and in this case the heating coil may be kept incandescent continuously, the heating coil being so arranged as to extend longitudinally of the chain 50 and so that it is disposed in spaced relation to but directly above the flattened end portion of the tube held between the ribbons 56 and 57. The passage of the tube beneath this heated coil causes the tube material to become soft and tacky. Beyond the heater 34a, two other endless steel bands 56 and 57 are arranged (at a level above that of the bands 52 and 53) and so that, as the flattened and softened upper portion of the tube advances, it passes between parallel runs 58 and 59 of the ribbons 56 and 57. Preferably, the runs 58 and 59 are somewhat closer together than the runs 56 and 57 so as to squeeze the softened material very firmly together and thus provide a coalesced union between the opposing plies. If desired, nozzles 60 may be arranged to deliver a blast of cold air against the ribbons 56 and 57 at about the point at which the ribbons engage the tube so that the runs 58 and 59 will be kept cold and thus will not tend to adhere to the softened tube material. The tube continues to advance along while held between the runs 58 and 59 for a period long enough to permit the softened material to set, the tubes eventually emerging from between the two sets of ribbons and being carried along by the chain 50 to any desired point of discharge. It will be understood that the vertical width of the ribbons of both sets are such as to engage the tube material through a vertically narrow area and that the widths of these ribbons and the vertical spacing of the upper and lower sets of ribbons may be varied in accordance with the particular type of tubing and the material of which it is made. It is likewise to be understood that any desired means, easily within the province of the skilled mechanic may be employed for driving the several parts in properly timed relation and for supplying current to the heating coil.

While certain desirable embodiments of the invention have herein been described, by way of example, it is understood that the invention is broadly inclusive of any and all modifications following within the scope of the appended claims, and is applicable to the sealing of other materials of a thermoplastic nature, as well as those specifically referred to.

I claim:

1. That method of uniting contacting plies of polyvinyl resin which comprises as steps, disposing marginal portions of the plies in contacting relation, subjecting the edges of said marginal portions to radiant heat, thereby to make said marginal portions tacky, cutting off the supply of heat, and then pressing said tacky marginal portions together between parts which are at approximately room temperature until the said portions coalesce.

2. That method of closing and sealing the filling end of a dispensing tube made of thermoplastic material, which comprises as steps, flattening the open end of the tube to bring marginal portions of its opposite walls into contact, causing said margins to become sticky by exposing their edges to radiant heat, and then pressing the sticky marginal portions together between rigid jaws which are approximately at room temperature.

3. That method of closing and sealing the filling end of a collapsible tube made of polyvinyl resin, which comprises as steps applying force to the tube adjacent to its filling end at diametrically opposite points thereby to flatten the tube and place marginal portions of its opposite walls in contact, subjecting the edges of said marginal portions to radiant heat, thereby to cause the material to become sticky, cutting off the supply of heat, and then applying pressure by parts at substantially room temperature to cause said marginal portions to coalesce.

4. Apparatus for use in forming a leaktight seam between the margins of two plies of thermoplastic material, said apparatus comprising means for clamping together marginal portions of the plies along a narrow area spaced from the edges of said margins, means spaced from the free edges of the clamped margins for directing radiant heat energy against said edges, thereby to cause the marginal material between said edges and the clamped area to become sticky, and pressing means associated with said clamping means operative to press the sticky portions of the margin into coalescing contact, said pressing means being at substantially room temperature.

5. Apparatus for use in closing and sealing the filling end of a dispensing tube made of thermoplastic material, said apparatus comprising means for holding a tube with its filling end uppermost, relatively movable clamp elements operative to engage the tube adjacent to its open upper end and at diametrically opposite points and to flatten the tube and hold narrow areas of its opposite walls in contact, a heat-emitting part which, in operative position, is spaced above the upper free edge of the tube and in position to make sticky the edge portion of the tube by radiant heat alone, and oppositely movable presser elements engageable with the sticky material of the tube between the clamped area and the upper edge of the tube, said presser elements being operative to press the softened portion of the opposite jaws into coalescence, and means for moving the presser elements toward each other, the presser elements being normally out of the field of action of said heat-emitting part.

6. Apparatus for use in closing and sealing the filling end of a dispensing tube made of polyvinyl resin, said apparatus comprising a base and a tube holder mounted thereon, the tube holder being designed to hold a tube with its axis substantially vertical and with the open end of the tube uppermost, relatively movable clamping elements supported by the base, the clamping elements having vertically narrow tube-contacting faces arranged to contact the tube at diametrically opposite points spaced from the free edge of its upper end, means for so relatively moving said clamping elements as to cause their tube-contacting faces to approach and thereby flatten the tube and bring narrow areas of its opposite walls into contact, a heater designed to emit radiant heat energy, means for moving the heater from an inoperative position to an operative position where it is spaced from the upper edge of the flattened tube but is capable of heating the marginal portion of the tube sufficiently to make said marginal portion tacky, relatively movable presser elements disposed at opposite sides of the flattened end portion of the tube and above the clamping elements, and means for moving the presser elements toward each other thereby to press the tube between them and coalesce the tacky walls of the tube.

7. Apparatus according to claim 6 wherein the heater comprises an electrical resistance coil, elongate horizontally and with its axis parallel to the upper edge of the flattened tube, a switch for controlling the supply of current to the coil, means for moving the heater from an elevated inoperative position to an operative position where it is spaced a predetermined distance above the upper edge of the flattened tube, and means operative to close the switch as the heater nears its operative position.

8. Apparatus according to claim 6 wherein at least one of the clamping elements is arranged to slide horizontally relatively to the base, and means comprising an eccentric for moving the clamping element toward tube-clamping position.

9. Apparatus according to claim 6 wherein the presser elements are arranged to slide horizontally toward and from each other, each presser element having a tube contacting face, and means comprising eccentrics for moving presser elements toward each other.

10. Apparatus according to claim 6 wherein the tube-contacting portion of one of the presser elements is formed on a part which is removable from the presser device proper, said removable part being provided with indicia forming means.

References Cited in the file of this patent

UNITED STATES PATENTS

| Number | Name | Date |
|---|---|---|
| 2,488,212 | Lloyd | Nov. 15, 1949 |
| 2,524,584 | Zehr | Oct. 3, 1950 |
| 2,606,850 | Piazze | Aug. 12, 1952 |